(12) United States Patent
Sumner

(10) Patent No.: US 11,744,256 B2
(45) Date of Patent: Sep. 5, 2023

(54) DEVICE AND METHOD FOR IMPARTING SMOKED FLAVORS TO BEVERAGES AND FOODSTUFFS

(71) Applicant: Soak Limited, Sandbach (GB)

(72) Inventor: Robert Sumner, Sandbach (GB)

(*) Notice: Subject to any disclaimer, the term of this patent is extended or adjusted under 35 U.S.C. 154(b) by 229 days.

(21) Appl. No.: 17/100,797

(22) Filed: Nov. 20, 2020

(65) Prior Publication Data

US 2021/0068409 A1 Mar. 11, 2021

(51) Int. Cl.
*A23B 4/052* (2006.01)
*A47J 37/07* (2006.01)

(52) U.S. Cl.
CPC ............ *A23B 4/052* (2013.01); *A23B 4/0523* (2013.01); *A47J 37/0786* (2013.01)

(58) Field of Classification Search
CPC ....... A23B 4/044; A23B 4/052; A23B 4/0523; A47J 37/0786; A47J 31/18; A47J 31/20
USPC ............................ 99/319, 320, 322, 323, 482
See application file for complete search history.

(56) References Cited

U.S. PATENT DOCUMENTS

| | | | | |
|---|---|---|---|---|
| 741,547 A * | 10/1903 | Renner | ................ | A47J 37/0704 99/481 |
| 946,578 A * | 1/1910 | Nather | .................. | A23B 4/0523 99/352 |
| 2,246,804 A | 6/1941 | Lipschutz | | |
| 2,967,023 A * | 1/1961 | Huckabee | ............ | A47J 37/0704 126/369 |
| 3,788,301 A | 1/1974 | Terry | | |
| 4,779,525 A | 10/1988 | Gaines | | |
| 5,048,406 A | 9/1991 | Cofer | | |
| 5,193,445 A | 3/1993 | Ferguson | | |
| 5,979,300 A * | 11/1999 | Donovan | ............. | A23C 9/1226 206/0.5 |
| 6,481,344 B1 | 11/2002 | Green | | |
| 6,779,438 B1 | 8/2004 | Citrynell | | |
| 6,971,305 B1 | 12/2005 | Thomas | | |
| 7,694,626 B2 | 4/2010 | Davis | | |
| 8,651,018 B1 * | 2/2014 | Loud, III | ............ | A47J 37/0704 99/481 |
| D721,539 S | 1/2015 | Johnson | | |

(Continued)

FOREIGN PATENT DOCUMENTS

WO 2020032912 A1 2/2020

OTHER PUBLICATIONS

Smoke Top cocktail smoker by Middleton Mixology https://middletonmixology.com/collections/all/products/smoketop-1.
(Continued)

*Primary Examiner* — Reginald Alexander
(74) *Attorney, Agent, or Firm* — Sheets Law PLLC; Kendal M. Sheets

(57) ABSTRACT

Disclosed is a smoker device for imparting smoked flavors to beverages and foodstuffs can include a base having at least a wall defining a first end and a floor with an opening defining a second end, a cover capable of being positioned over the base first end, thereby defining an enclosed cavity, and a conduit portion defining an open channel at a first end and closed at a second end, the first end connecting to a perimeter of the base floor opening, creating a passageway from the enclosed cavity to the channel. Also disclosed is a method for using the smoker device to impart smoked flavors to beverages and foodstuffs.

19 Claims, 10 Drawing Sheets

(56) References Cited

U.S. PATENT DOCUMENTS

| | | | |
|---|---|---|---|
| 9,433,241 | B2 | 9/2016 | Jalloul |
| 9,603,372 | B2 | 3/2017 | Bader |
| 10,420,351 | B2 | 9/2019 | Vinett |
| 2004/0025714 | A1 | 2/2004 | Neal |
| 2006/0042641 | A1 | 3/2006 | Young |
| 2010/0218691 | A1* | 9/2010 | Adams .................. A23B 4/052 99/482 |
| 2014/0216268 | A1* | 8/2014 | Burch .................. A23B 4/0523 99/352 |
| 2014/0261015 | A1 | 9/2014 | Nelson |
| 2014/0261016 | A1 | 9/2014 | Kaderil |
| 2018/0371387 | A1 | 12/2018 | Hall et al. |

OTHER PUBLICATIONS

Crafthouse Smoking Cloche https://www.potterybarn.com/products/crafthouse-smoking-cloche/?pkey=cdrink-accessories&sku=cm_src=drink-accessories||NoFacet -_- NoFacet -_-_- &isx=0.0.2112.

Crafthouse Smoking Box https://www.williams-sonoma.com/products/crafthouse-cocktail-smoking-box/?catalogId=79&sku=4203118&cm_ven=PLA&cm_cat=Google&cm_pla=Tabletop%20%26%20Bar%20%3E%20Bar%20Tools&adlclid=e161db514f3e1c7545cebacfc8133ec1&msclkid=e161db514f3e1c7545cebacfc8133ec1.

TF Turning, Instagram Photo, 3 pages, Oct. 7, 2019, downloaded from https://www.instagram.com/p/B3UPH35APu5/.†

TF Turning, Instagram Photo, 2 pages, Sep. 30, 2019, downloaded from https://www.instagram.com/p/B3C-RQXgVjx/.†

Soak London, Instagram Photo, 1 page, Sep. 5, 2018, downloaded from https://www.instagram.com/p/BnWQ_q1A1rN/.†

Soakbe, Instagram Video, 2 pages, Apr. 15, 2019, downloaded from https://www.instagram.com/p/BwSBwgMHmLv/.†

Soak London, Facebook Video, 1 page, Apr. 15, 2019, downloaded from https://www.facebook.com/soaklondon/videos/vb.948651265275370/367872713810659/?type=3&theater.†

Soak London, Instagram Video, 2 pages, Apr. 15, 2019, downloaded from https://www.instagram.com/p/BwSBbcdnsRr/.†

My Hartwood, Facebook Video, 1 page, Apr. 15, 2019, downloaded from https://www.facebook.com/myhartwood/videos/vb.415556941940568/323769611664696/?type=3&theater.†

Soak London, Instagram Photo, 1 page, Jul. 9, 2019, downloaded from https://www.instagram.com/p/BztheErF3H_/.†

My Hartwood, Facebook Photo, 1 page, Jul. 9, 2019, downloaded from https://www.facebook.com/myhartwood/photos/a.1006958802800376/1253181974844723/?type=3&theater.†

Soak London, Facebook Photo, 1 page, Oct. 4, 2019, downloaded from https://www.facebook.com/soaklondon/photos/a.948668951940268/1521127901361034/?type=3&theater.†

Zuma Rome, Instagram Photo, 1 page, Jun. 20, 2019, downloaded from https://www.instagram.com/p/By8WSpfnt39/.†

Zuma HK, Instagram Photo, 1 page, Jun. 27, 2019, downloaded from https://www.instagram.com/p/BzNzATUo_yb/.†

\* cited by examiner
† cited by third party

Cross-section A-A'

Cross-section A-A'

DEVICE AND METHOD FOR IMPARTING SMOKED FLAVORS TO BEVERAGES AND FOODSTUFFS

BACKGROUND

Alcoholic beverages such as cocktails are traditionally either served neat, over ice, or blended with juice or other mixing agents. For many spirits such as whiskey, flavors are traditionally added by introducing the distilled spirit into American Oak or other types of barrels, where color, sweetness, wood flavors, and smoke flavors from charcoal are infused from the wood into the spirit.

Prior devices have been commercialized that attempt to impart smoky and spicy flavors into individually-served beverages in order to replicate the flavors of "aging" a spirit in a barrel. For example, hand-held or "bartop" smokers consist of a glass box in which a drinking glass can be enclosed. Wood chips are placed in a screen within a torch device and a hose connects the torch device securely into the glass box. As the torch is lit, it burns wood fuel and smoke pours through the hose into the box, thereby filling the box with smoke and adhering smoke to the drinking glass and infusing smokey flavors into the beverage. This device has many limitations, however, such as having to clean the glass box after each use and adhering smokey residue (and flavors) to the outside of the drinking glass as well the inside of the glass.

Another device that has been commercialized uses a cut a piece of a wood stave from a whiskey barrel, having a circular groove carved into wood that will accept a glass rim. A portion of the stave piece is then lit on fire, and an empty glass is then turned upside down and placed onto the stave. Smoke can fill the glass, which is then removed after smoking completes. This device cannot infuse smokey flavors into a beverage, however, since an empty glass must be used.

The disclosed systems and methods are directed to overcoming one or more of the shortcomings set forth above and/or other shortcomings of the prior art.

SUMMARY

There is a need for a device to impart smokey and other flavors through a flow of smoke into an alcoholic beverages and foodstuffs that overcomes the problems of the prior art.

In one aspect of the disclosure, a device for imparting smoked flavors to beverages and foodstuffs can include a base having at least a wall defining a first end and a floor with an opening defining a second end, a cover capable of being positioned over the base first end, thereby defining an enclosed cavity, and a conduit portion defining an open channel at a first end and closed at a second end, the first end connecting to a perimeter of the base floor opening, creating a passageway from the enclosed cavity to the channel. In another aspect, the conduit portion can include at least one aperture that extends from the channel through an outer wall of the conduit portion. In another aspect, the base, conduit, and lid are circumferential in shape. In yet another aspect, the conduit portion further comprises a plurality of apertures. In still another aspect, the plurality of apertures are positioned between a top end and a bottom end of the conduit portion. Other aspects include the aperture extends from the conduit portion at a rising angle towards the base floor opening. In one aspect, the base floor extends at a rising angle away from the lowermost floor opening. Another aspect includes a screen capable of being received by the base floor. In another aspect, the conduit portion is capable of receiving a portion of the screen into the channel.

In other aspects of the embodiments, method can be used for imparting smoked flavors to beverages and foodstuffs that includes providing a device for imparting smoked flavors to beverages and foodstuffs, which includes providing a base having at least a wall defining a first end and a floor with an opening defining a second end, and a conduit portion defining an open channel at a first end and closed at a second end, the first end connecting to a perimeter of the base floor opening, creating a passageway from the enclosed cavity to the channel, wherein the conduit portion includes at least one aperture that extends from the channel through an outer wall of the conduit portion, positioning a screen into the passageway, positioning fuel onto the screen, igniting the fuel on the screen, and positioning a cover over the base first end, thereby defining an enclosed cavity above the base floor. In other aspects, the method can include positioning the device over an opening of a container such that the conduit portion is disposed into the container and the at least one aperture is positioned below a top of the container. In an aspect, the method can include smoke that streams from the at least one aperture into the container. In another aspect, the at least one aperture comprises a plurality of apertures positioned around the conduit portion. In other aspects, the at least one aperture extends from the conduit portion at a rising angle towards the base floor opening. In another aspect, the base floor extends at a rising angle away from the floor opening.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
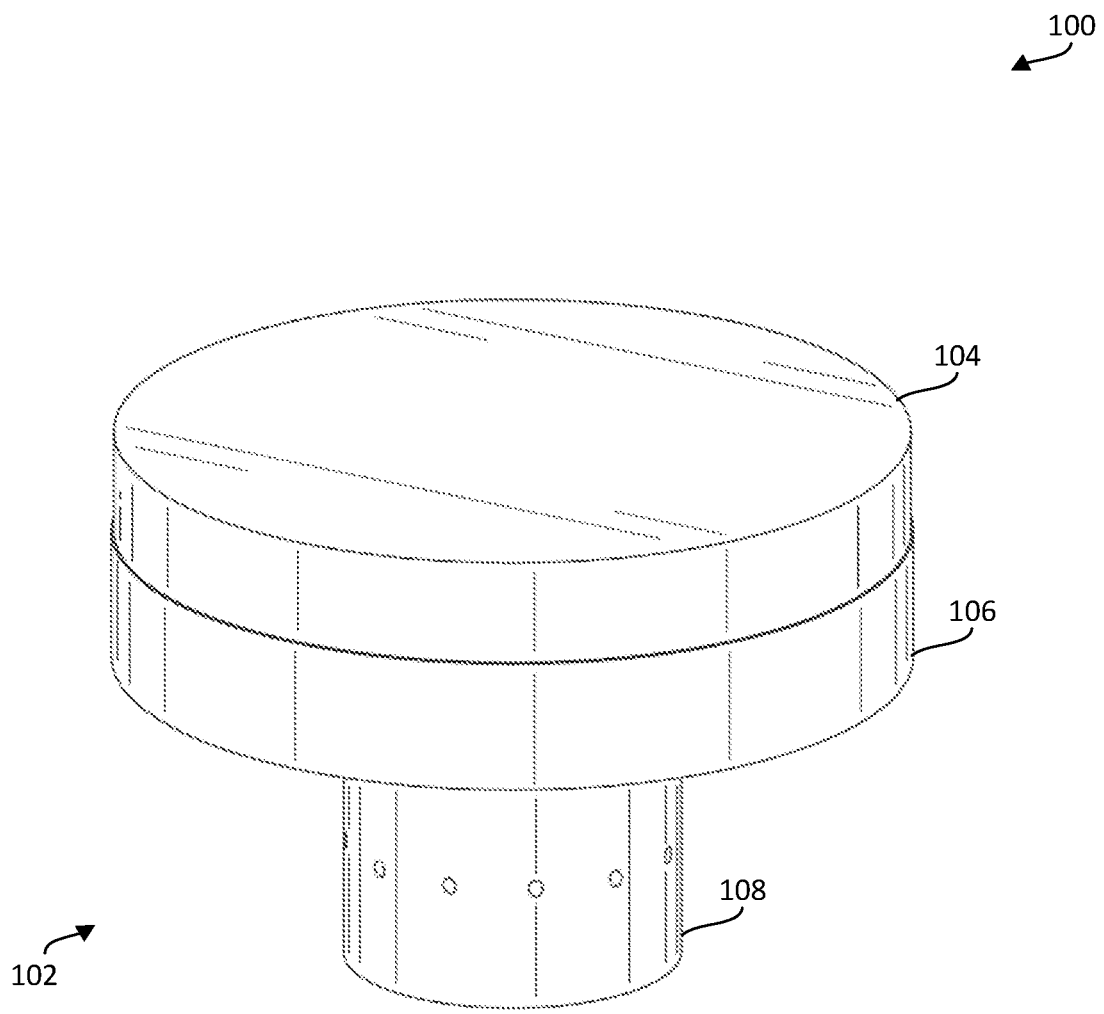
FIG. 1 illustrates a perspective view of an embodiment for a smoker device.
Figure 2:
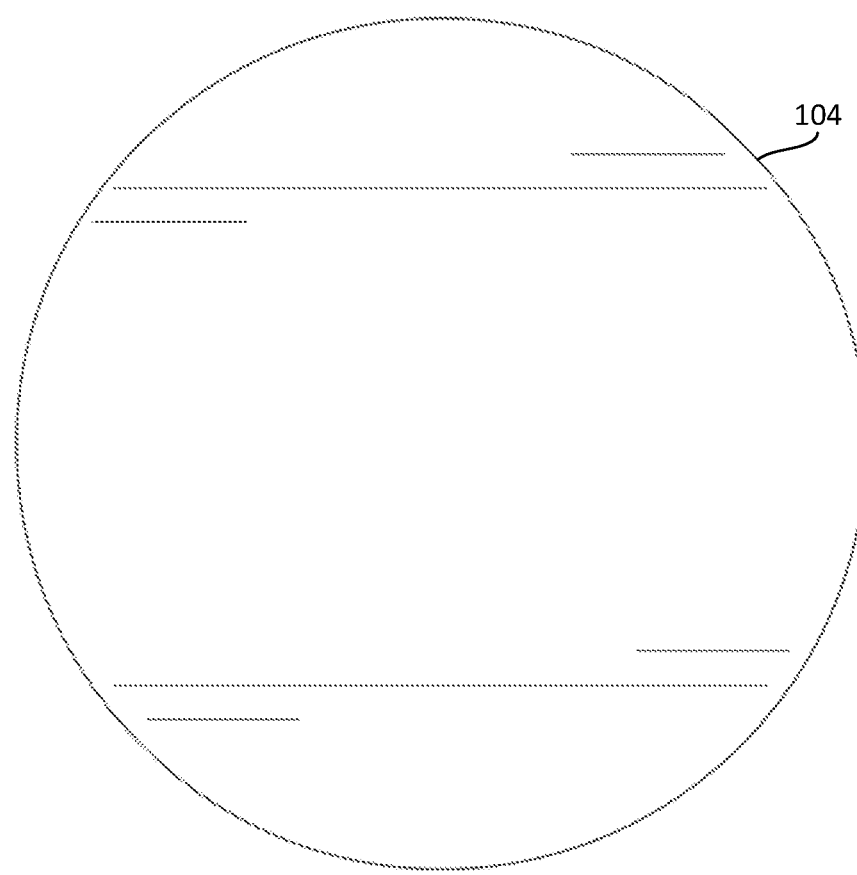
FIG. 2 illustrates a top view of an embodiment for a smoker device of FIG. 1.
Figure 3:
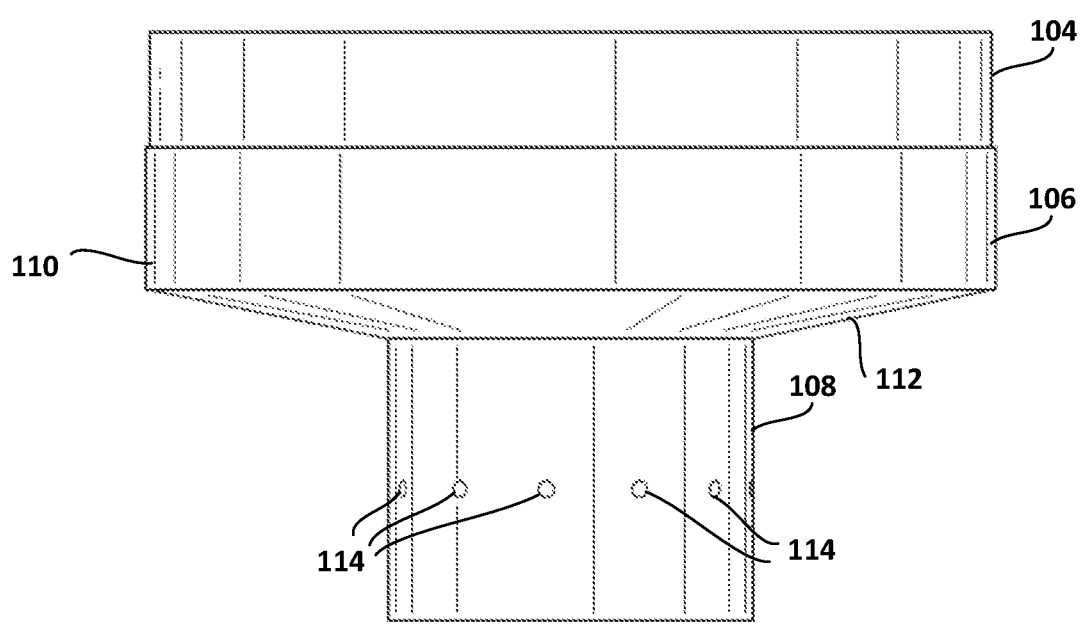
FIG. 3 illustrates a side view of an embodiment for a smoker device of FIG. 1.
Figure 4:
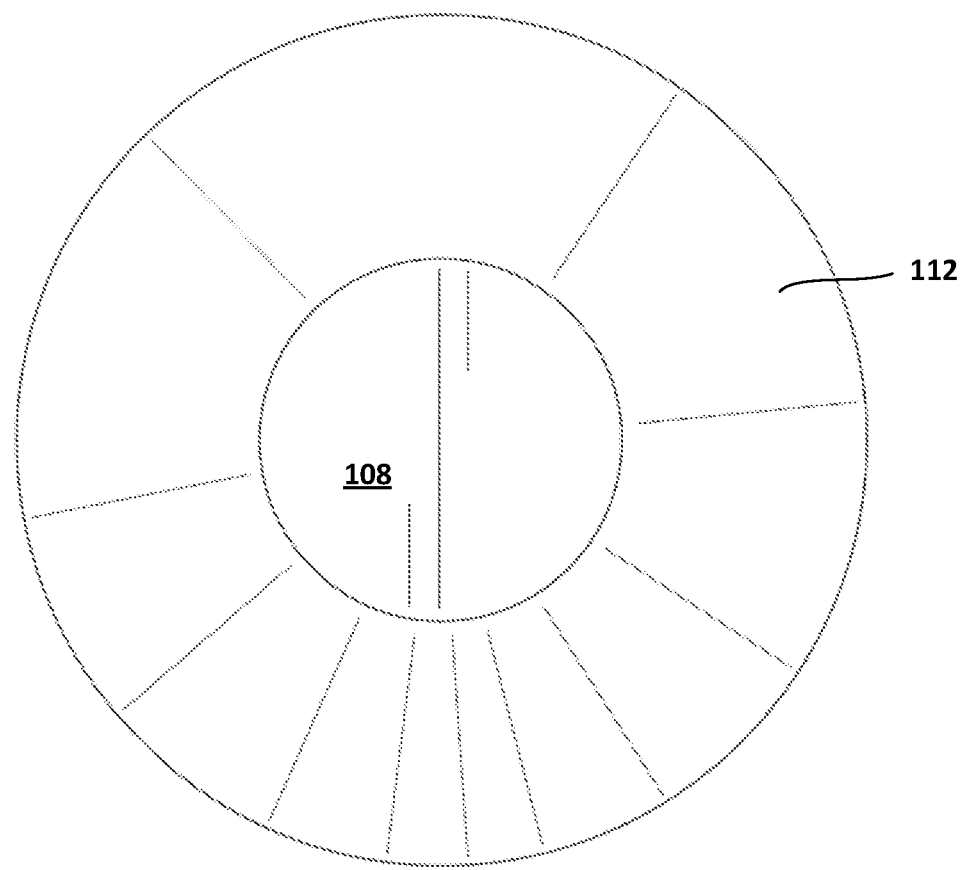
FIG. 4 illustrates a bottom view of an embodiment for a smoker device of FIG. 1.

FIG. 1 illustrates a perspective view of an embodiment for a smoker device. FIGS. 2, 3, and 4 illustrate top, side, and bottom views of the exemplary smoker device, respectively. In an embodiment, the smoker device 100 may comprise a cylindrically shaped base 102 and a cylindrically shaped cover 104. In other embodiments, it is understood that the smoker device 100 may be generally formed in square, rectangle, elliptic, customized such as lettering or company logos, or any other shapes that can fall within the claims or their equivalents. Embodiments of the smoker device 100 can be manufactured of wood, resin, plastic, metal, stone, clay, or any material that can function according to the disclosure provided herein.

In the embodiments, the base 102 can be formed with a cylindrical hollow fuel chamber portion 106 at its uppermost or first end and a hollow, cylindrical conduit portion 108 at its lowermost end. The fuel chamber portion 106 can comprise at least an upper wall portion 110 defining a perimeter edge and first end. The fuel chamber portion 106 can also include a floor 112 defining a second, or bottom, end. The fuel chamber portion 106 can be operable to carry fuel, such as wood chips, for smoking food or beverages. The cover 104 can be capable of being positioned over the base uppermost or first end. By positioning the cover 104 in such a manner over the base uppermost or first end, an enclosed cavity can be defined within the base 102. The cover 104 may seal, or partially seal, with the fuel chamber portion 106. In an embodiment, the cover 104 loosely seats onto the uppermost portion of the fuel chamber portion 106 so as to provide ease of removal after a smoking procedure has completed. In some embodiments, the cover 104 may be unattached to the fuel chamber portion 106. In other embodiments, the cover 104 may be removably attached to the fuel chamber portion 106.

FIG. 2 illustrates a top view of an embodiment for the smoker device 100 of FIG. 1. Cover 104 is shown disposed over the fuel chamber portion 106 (not shown). An effect of cover 104 is to create an enclosed cavity within base 102 such that air trapped in such cavity can be utilized by a fuel for ignition and burning, and such cavity can prevent or substantially prevent smoke from rising up and out of the fuel chamber portion 106. In an embodiment, cover 104 may be a larger size, such as a larger diameter, than the outermost size or diameter of the fuel chamber portion 106. In other embodiments, cover 104 may be the same size or slightly smaller than the outermost size or diameter of the fuel chamber portion 106. In the embodiments, any size of the cover 104 that can function to prevent or substantially prevent smoke from rising up and out of fuel chamber portion 106 may be appropriate.

FIG. 3 illustrates a side view of an embodiment for the smoker device 100 of FIG., and FIG. 4 illustrates a bottom view of an embodiment for the smoker device 100 of FIG. 1. In the embodiment, conduit portion can be sealably attached to floor 112. In other embodiments, conduit portion 108 and fuel chamber portion 106 can be constructed as a single unit. For example, conduit portion 108 and fuel chamber portion 106 can be formed either out of one piece of wood or manufactured from a continuous plastic or resin mold. Conduit portion 108 may be open to fuel chamber portion 106 at its uppermost top end and sealably closed at its bottom terminal end. In an embodiment, conduit portion 108 is a hollow cylindrical structure centrally disposed on a longitudinal axis with the fuel chamber portion 106. In other embodiments, conduit portion 108 may be disposed in any position below the floor 112 so as to facilitate a channel space for a flow of smoke from the fuel chamber portion 106 and the conduit portion 108 into and through one or more apertures 114.

Each aperture 114 is an open hole through an outer wall of the conduit portion 108 that can extend a vent for smoke from the channel space to the exterior of the conduit portion 108. In some embodiments, apertures 114 may be distally disposed around conduit portion 108 in an evenly-spaced manner. In another embodiment, apertures 114 may be positioned between an uppermost top end a bottom terminal end of the conduit portion 108 in any configuration or orientation that can operate as channels to facilitate the passage of smoke from the conduit portion 108. In the embodiments, apertures 114 may be formed as cylindrical, elliptical, or irregular shaped channels. In an embodiment, apertures 114 are positioned approximately mid-way between an uppermost top end and bottom terminal end of the conduit portion 108. In other embodiments, positions of the apertures 114 may vary. However, apertures 114 should be disposed on conduit portion 108 in such positions that apertures 114 will be disposed below a top rim of a drinking glass or glass enclosure after the smoker device 100 is placed upon such glass or enclosure, which is described below in relation to FIGS. 7 and 8.

Figure 5A:
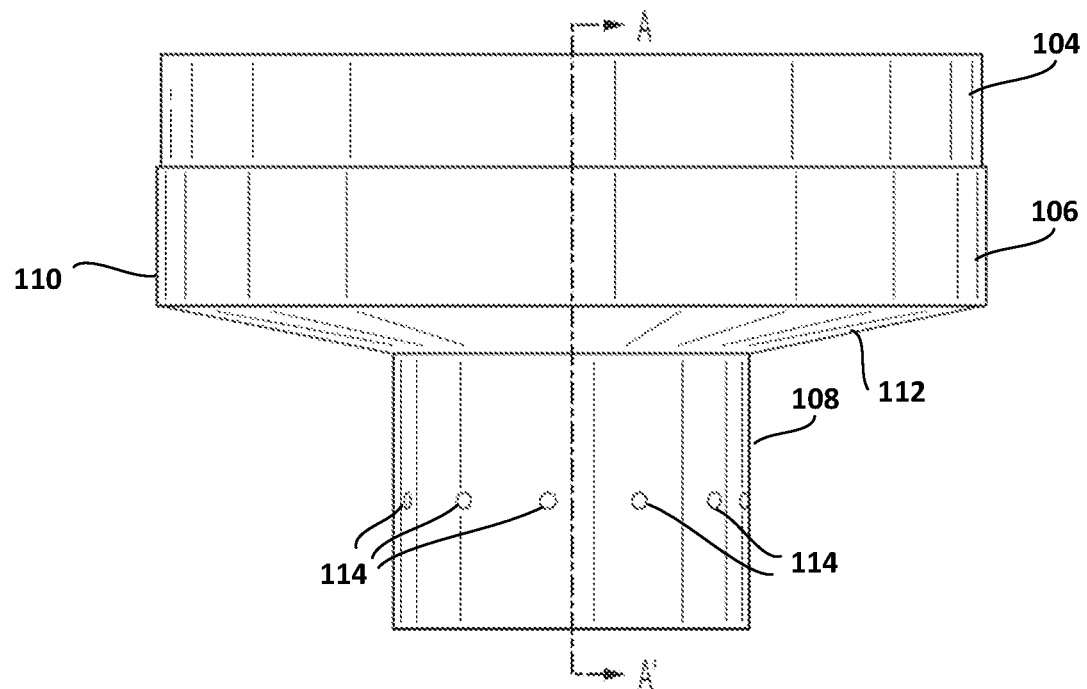
FIG. 5A illustrates a side view of an embodiment for a smoker device of FIG. 1.
Figure 5B:
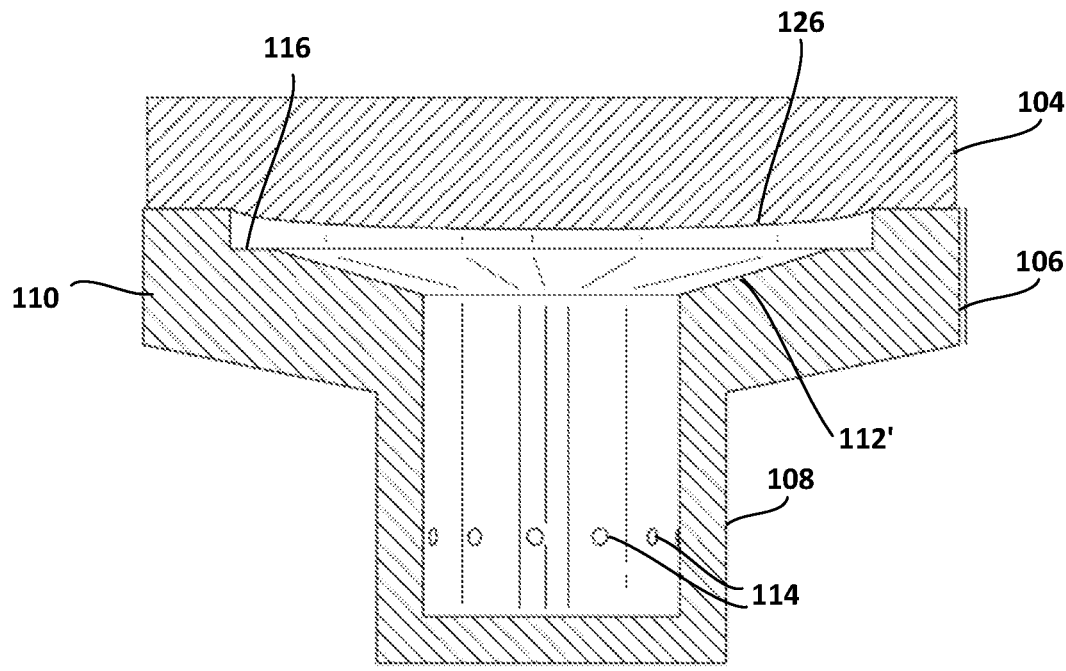
FIG. 5B illustrates a cross-sectional view of the embodiment for a smoker device of FIG. 5A.

FIG. 5A illustrates a side view of an embodiment for the smoker device 100 and FIG. 5B illustrates a cross-sectional view of the embodiment for a smoker device of FIG. 5A. In the embodiments, the lowermost end of cover 104 is formed with a protrusion 126. The protrusion 126 can be disposed such that, when cover 104 is positioned over base 100, protrusion 126 will rest inside of an innermost wall of upper wall portion 110, thereby preventing lateral movement of cover 104 once seated. The inner base floor 112' can be disposed at a rising angle, beginning at an uppermost terminal end of the conduit portion 108 and terminating at a shelf 116. The shelf 116 can be formed abutting the innermost wall of upper wall portion 110 with a planar distance of the shelf 116 sized to facilitate seating of a screen 118.

Figure 5C:
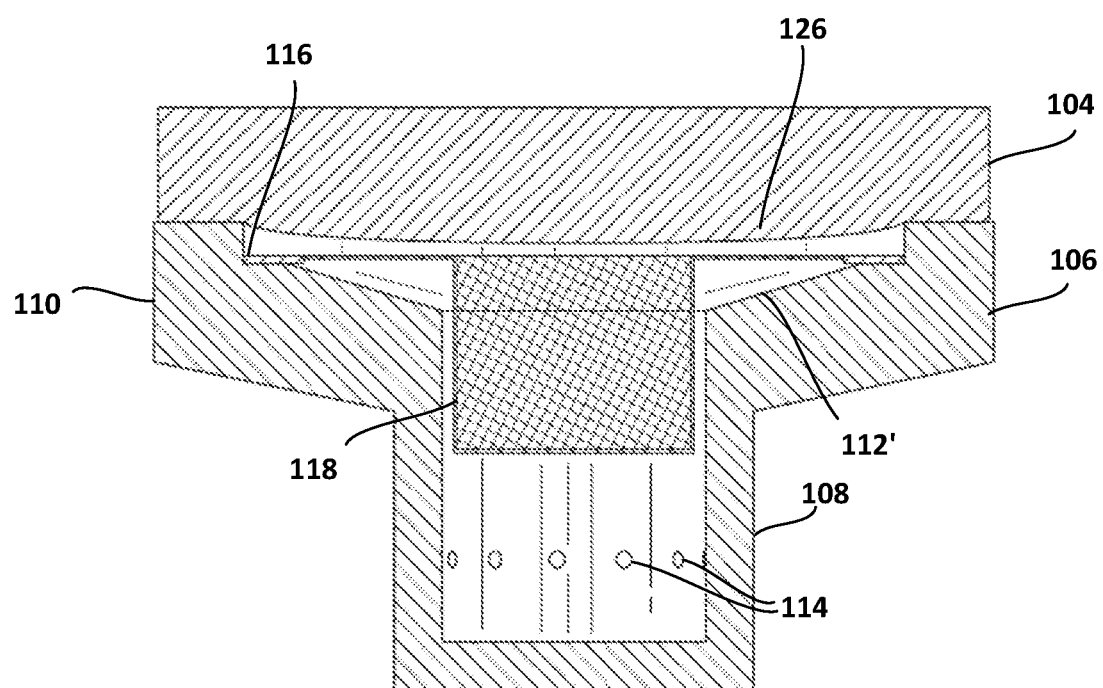
FIG. 5C illustrates a cross-sectional view of the embodiment for a smoker device of FIG. 5A with a screen.
Figure 6:
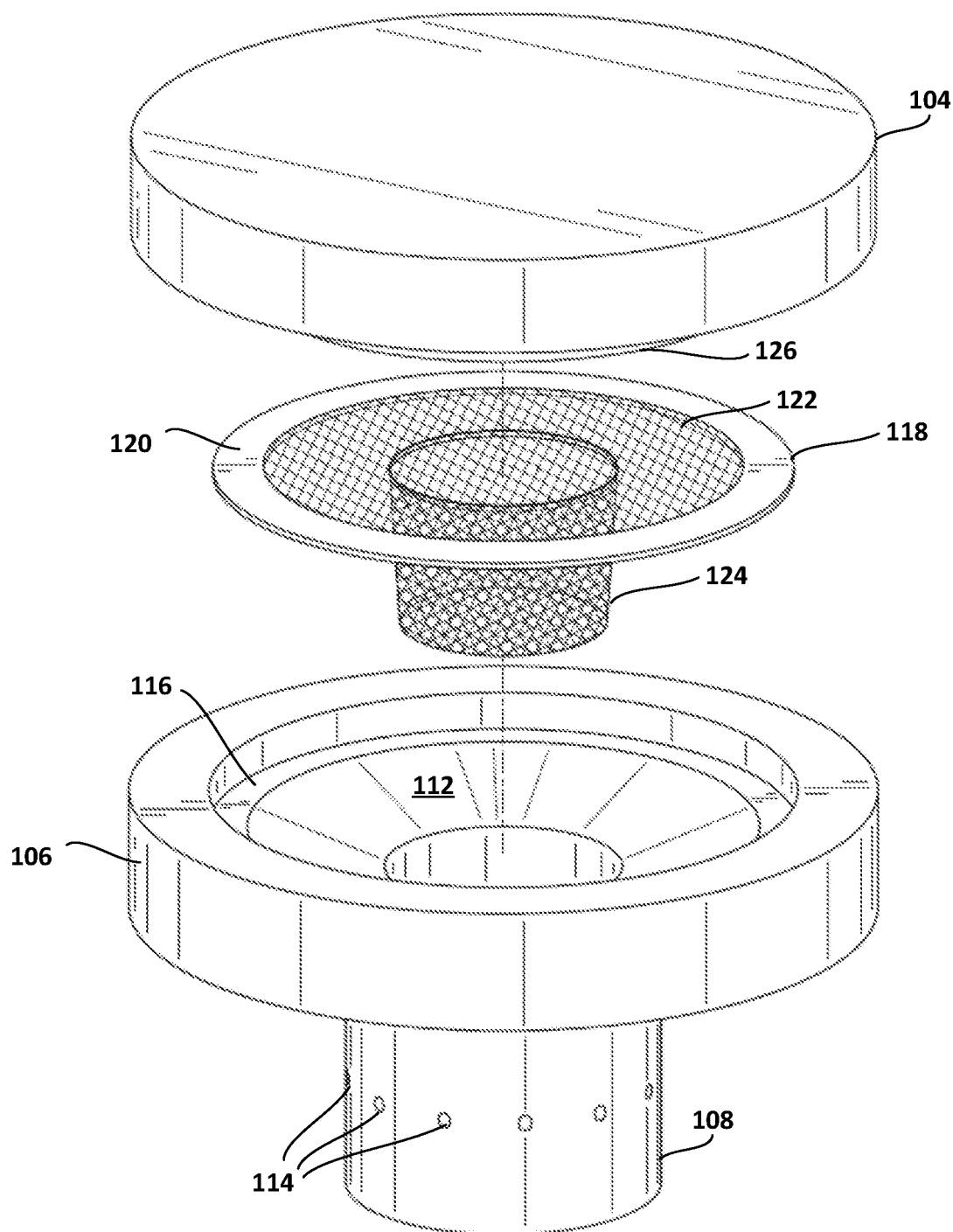
FIG. 6 illustrates an exploded view of an embodiment for a smoker device of FIG. 1.

FIG. 5C illustrates a cross-sectional view of the embodiment for a smoker device of FIG. 5A with a screen 118, and FIG. 6 illustrates an exploded view of an embodiment for the smoker device 100. In the embodiments, the screen 118 can be disposed to seat within fuel chamber portion 106 and in some embodiments, also be partially disposed within conduit portion 108. The screen 118 can be formed of metal grating, metal sheets with holes, or any other appropriate substance or perforations known in the art. In the embodiments, the screen 118 can be sized with multiplicity of holes that can permit heat and air to pass through the grating, while contemporaneously holding fuel such as wood chips, thereby preventing most or all of the fuel from falling through the screen 118. In an embodiment, the screen 118 can be formed with a first upper portion 122 and second lower portion 124. The upper screen portion 122 can be formed at a same or similar angle rise as the floor 112 with a flat ring 120 securely disposed at its outer terminal perimeter. Ring 120 can be formed at a same width as shelf 116. In operation, ring 120 can seat onto shelf 116, providing support to hold the screen 118 within base 102.

The angle of the floor 112 rise and screen upper portion 122 rise can be selected at any angle to advantageously support screen 118 as well as to facilitate fuel pieces falling towards the center of screen 118 when loading the fuel onto the screen 112. In other embodiments, floor 112 rise and screen upper portion 122 may be flat without a rise or other orientations without compromising the operation of the smoker device 100. Screen lower portion 124 can be formed in a cylindrical manner with a closed lowermost terminal end to hold fuel and open uppermost end to provide access to ignite the fuel. When seated into base 102, the screen lower portion 124 can be disposed into the conduit portion 108. Screen lower portion 124 can be elongated at any distance such that its lowermost terminal end preferable does not reach or touch the lowermost terminal end of the conduit portion 108.

In an embodiment, apertures 114 may be oriented as horizontal channels through conduit portion 118. In other embodiments, apertures 114 may be oriented with rising angles of the channels towards the floor 112 opening in fuel chamber portion 106. Such a rising angle for aperture 114 channels can enhance the flow of smoke from screen 118 out of the conduit portion 118.

Figure 7:
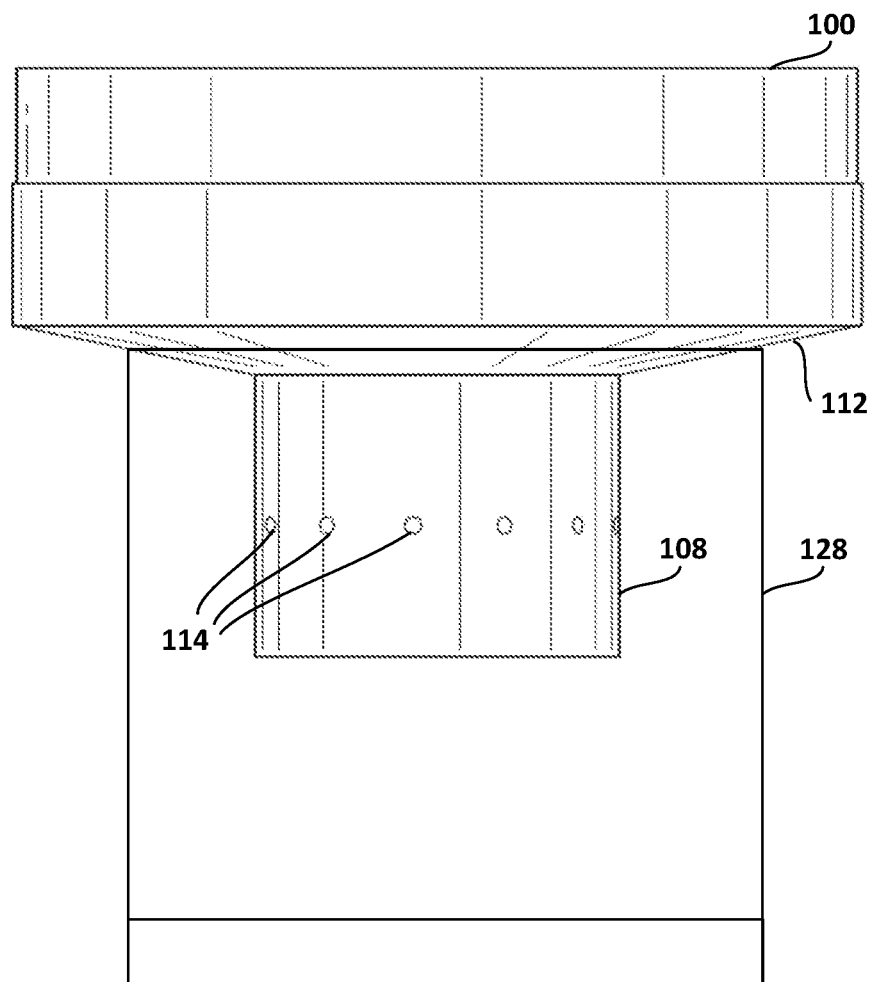
FIG. 7 illustrates an embodiment for a smoker device of FIG. 1 positioned over a drinking glass.
Figure 8:
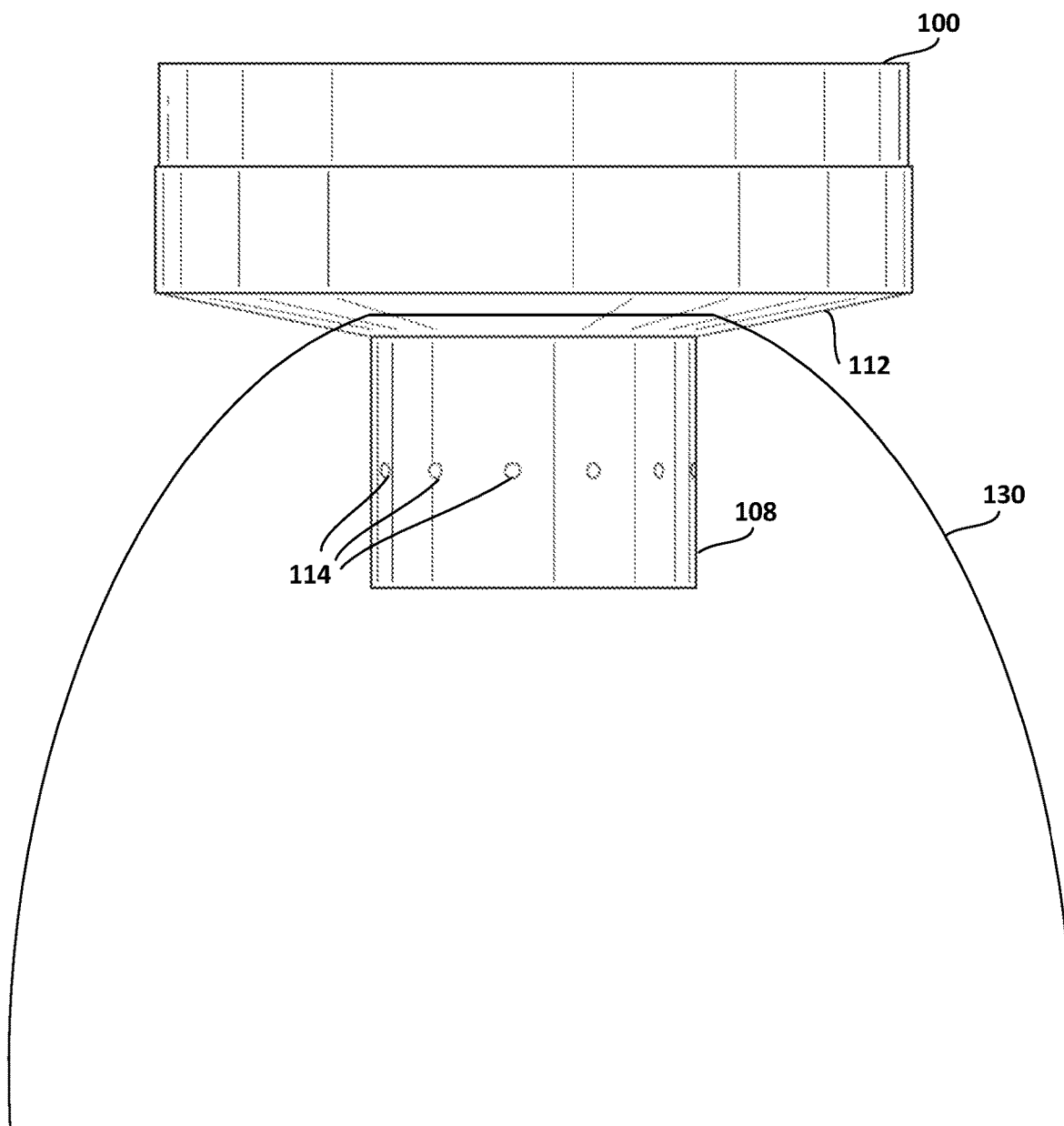
FIG. 8 illustrates an embodiment for a smoker device of FIG. 1 positioned over a glass cover.

FIG. 7 illustrates an embodiment for the smoker device 100 positioned over a drinking glass 128. In the embodiments, conduit portion 108 is sized to be disposed within common drinking glasses used by bartenders to serve cocktails. Floor 112 can be sized to rest upon an uppermost rim of the drinking glass 128 so as to suspend conduit portion 108 within the glass 128. Apertures 114 should preferably be oriented so as to be disposed below the uppermost rim of glass 128. FIG. 8 illustrates an embodiment for the smoker device 100 positioned over a glass cover 130. To facilitate operation of the smoker device 100 for foodstuffs, in the embodiments, conduit portion 108 is sized to be disposed within an uppermost opening in the glass cover 130, which can be used to cover a plate, platter, or any flat space holding food. Floor 112 can be sized to rest upon an uppermost portion of glass cover 130 so as to suspend conduit portion 108 within the glass cover 130. Apertures 114 should preferably be oriented so as to be disposed below the opening of glass cover 130.

Figure 9:
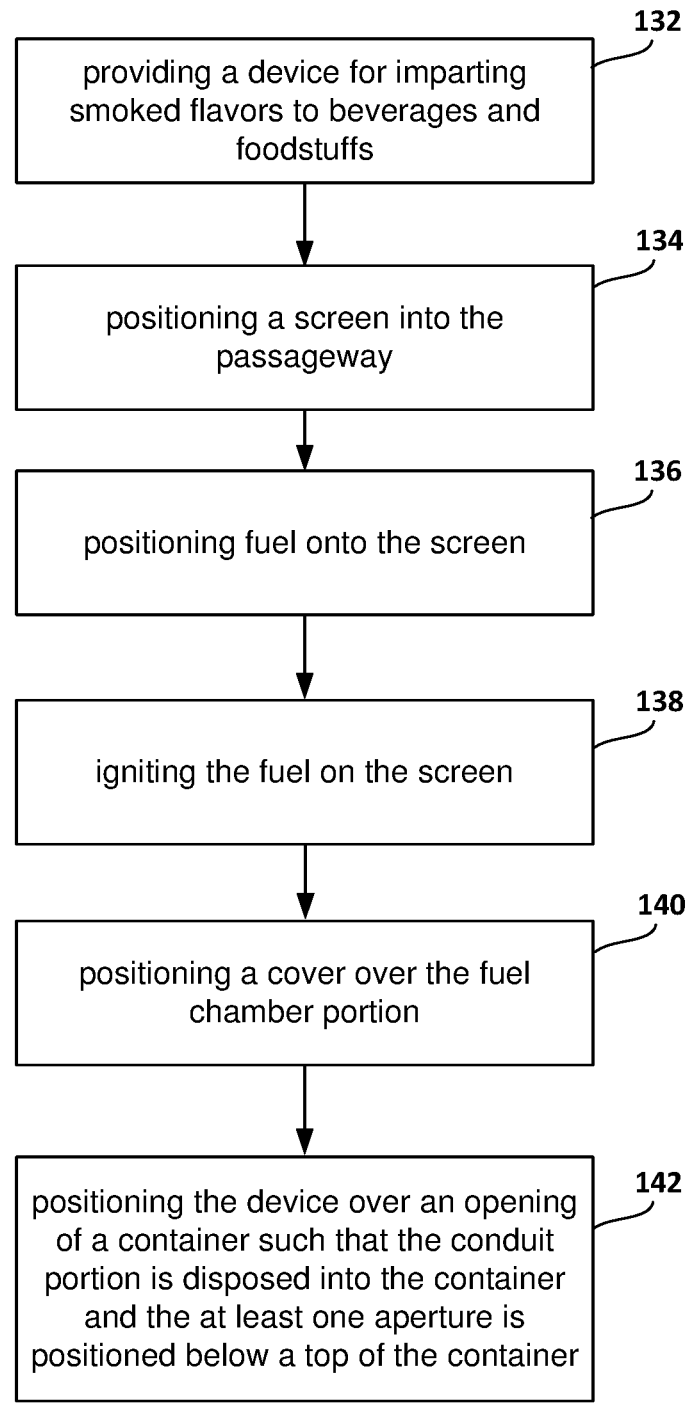
FIG. 9 depicts a flowchart of an embodiment for a method for adding smoke flavor to food and beverages.

FIG. 9 depicts a flowchart of an embodiment for a method for adding smoke flavor to food and beverages using an embodiment of the smoker device 100. In operation, in step 132, a device for imparting smoked flavors to beverages and foodstuffs can be provided. In the embodiments, the smoker device 100 can be provided for the operation. At step 134, the cover 104 may be removed from the smoker device 100 and a screen 118 can be positioned into the smoker device 100. At step 136, fuel, such as wood chips, may be placed onto the screen 118. In other embodiments, fuel may be placed onto the screen 118 prior to positioning the screen 118 within smoker device 100. At step 138, the fuel can be ignited using a chef's torch, lighter, or any appropriate ignition device. At step 140, the cover 104 can be positioned and seated onto the fuel chamber portion 106. At step 142, the device can be positioned over an opening of a container such that the conduit portion is disposed into the container and the at least one aperture is positioned below a top of the container.

After the fuel is ignited, the design of the smoker device will unexpectedly facilitate smoke to flow downward from the screen 118, through at least one aperture 114 and preferably all apertures 114, and out of the smoker device 100. When the smoker device is positioned above a glass 128, the smoke can flow into any empty space within the glass. The smoke flow can then infuse a smoke flavor into or onto a beverage and/or upon inner walls of the glass 128. When the smoker device is positioned above a glass cover 130, the smoke can flow into any empty space within the cover. The smoke flow can then infuse a smoke flavor into or onto foodstuffs within the glass cover 130 and/or upon inner walls of the glass cover 130.

It will be apparent to those skilled in the art that various modifications and variations can be made to the disclosed IoT data compression system and method. Other embodiments will be apparent to those skilled in the art from consideration of the specification and practice of the disclosure. It should be appreciated that different embodiments and different features of embodiments can be used with other embodiments. It is intended that the specification and examples be considered as exemplary only, with a true scope being indicated by the following claims and their equivalents.

What is claimed is:

1. A device for imparting smoked flavors to beverages and foodstuffs, comprising:
   a base having a fuel chamber portion at its upper end and a conduit portion at its lower end, the fuel chamber portion comprising an upper wall portion defining a perimeter edge of the fuel chamber portion and a floor defining a bottom end, the floor extending from the upper wall portion to an opening in the floor,
   wherein the fuel chamber portion is oriented to hold fuel, and
   wherein the conduit portion is disposed below the floor and comprises a channel through the conduit portion so that, when the fuel in the fuel chamber portion is ignited, the channel facilitates flow of smoke downward from the fuel chamber portion through at least one aperture that extends from the channel space through a wall of the conduit portion.

2. The device of claim 1, further comprising a cover that is formed to seat upon the upper wall portion.

3. The device of claim 1, wherein the conduit portion further comprises a plurality of apertures.

4. The device of claim 3, wherein the plurality of apertures are positioned between a top end and a bottom end of the conduit portion.

5. The device of claim 1, wherein the aperture extends through the wall of the conduit portion at any position on the conduit portion.

6. The device of claim 1, wherein the floor extends at a rising angle away from the opening in the floor to the upper wall portion.

7. The device of claim 1, further comprising a screen capable of being received by the base floor.

8. The device of claim 7, wherein the conduit portion is smaller in size than the fuel chamber portion.

9. A device for imparting smoked flavors to beverages and foodstuffs, comprising:
   a fuel chamber portion having at least a wall defining a first end and a floor with an opening defining a second end,
   wherein the fuel chamber portion is oriented to hold fuel; and
   a conduit portion, connected to the floor of the fuel chamber portion, defining an open channel at a first end, the first end connecting to a perimeter of the floor opening, creating a passageway from the enclosed cavity to the channel,
   wherein the conduit portion includes at least one aperture that extends from the channel through an outer wall of the conduit portion so that, when the fuel in the fuel chamber portion is ignited, the channel facilitates flow of smoke downward from the fuel chamber portion through the aperture.

10. A device for imparting smoked flavors to beverages and foodstuffs, comprising:

a fuel chamber portion comprising an upper wall portion defining a perimeter edge of the fuel chamber portion and a floor defining a bottom end, the floor extending from the upper wall portion to an opening in the floor, wherein the fuel chamber portion is oriented to hold fuel; and a conduit portion, disposed below the floor, comprising a channel space through the conduit portion so as to facilitate passage of smoke from the fuel chamber portion through at least one aperture that extends from the channel space through a wall of the conduit portion so that, when the fuel in the fuel chamber portion is ignited, the channel facilitates flow of smoke downward from the fuel chamber portion through the aperture.

11. The device of claim 10, wherein the floor is formed at a rising angle from the opening to the upper wall portion.

12. The device of claim 10, wherein the floor is formed flat between the upper wall portion and the opening.

13. The device of claim 10, further comprising a cover that is formed to seat upon the upper wall portion.

14. The device of claim 10, wherein the conduit portion is sealably attached to the floor portion.

15. The device of claim 10, wherein the conduit portion and the fuel chamber portion are formed from a single unit of material.

16. The device of claim 10, further comprising a screen formed to partially fit within the opening in the floor portion of the upper fuel portion.

17. The device of claim 10, wherein the conduit portion is smaller in size than the fuel chamber portion.

18. The device of claim 10, wherein the conduit portion is sized to insert into a drinking glass.

19. The device of claim 10, wherein the floor is sized to rest on the edge of a top of a drinking glass.

* * * * *